(Model.)

D. H. BULL.
HARROW CULTIVATOR.

No. 268,617. Patented Dec. 5, 1882.

Witnesses:
T. Walter Fowler
Edw. J. Redmond

Inventor:
D. H. Bull
by J. A. H. Evans & Co
Attys.

UNITED STATES PATENT OFFICE.

DANIEL H. BULL, OF GREENVILLE COUNTY, SOUTH CAROLINA.

HARROW-CULTIVATOR.

SPECIFICATION forming part of Letters Patent No. 268,617, dated December 5, 1882.

Application filed July 6, 1882. (Model.)

To all whom it may concern:

Be it known that I, DANIEL H. BULL, a citizen of the United States, residing in the county of Greenville and State of South Carolina, have invented a new and useful Improvement in Harrow-Cultivators, of which the following is a full, clear, and exact description, reference being had to the accompanying drawings, in which—

Figure 1:
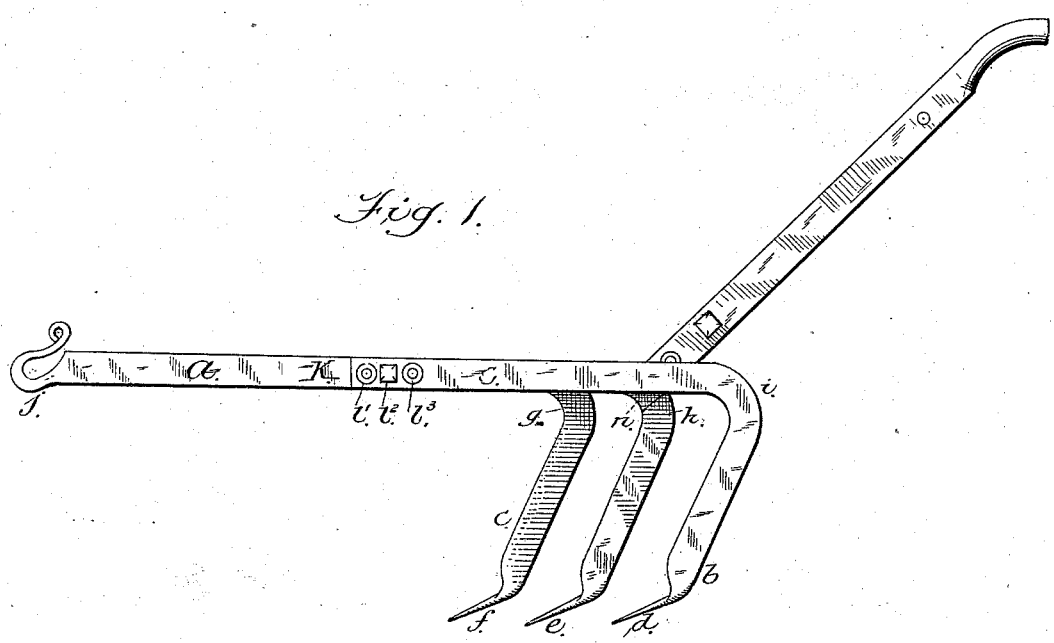
Figure 2:
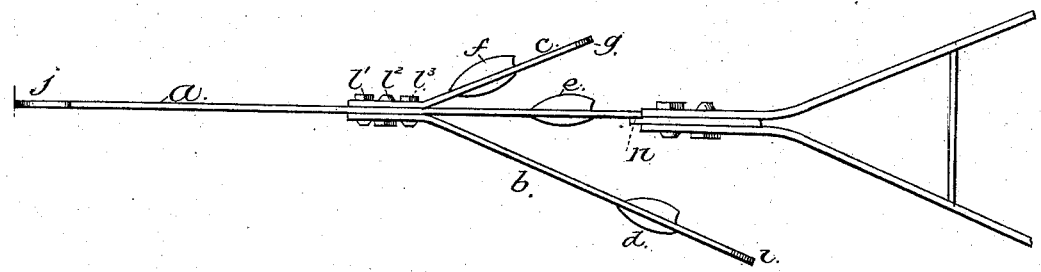

Figure 1 is a side elevation of a harrow-cultivator provided with my improved tooth. Fig. 2 is a top plan view of the harrow-tooth.

My invention relates to harrows for cultivating the soil; and it consists in the peculiar construction of the tooth or blade of the harrow.

To enable others to make and use my invention, I will proceed to describe the exact manner in which I have carried it out.

In the drawings, A represents the harrow-frame, made in the ordinary manner.

B B B are the teeth secured thereto. These teeth are made of flat bars of metal, and present the thin edge of the bar to the soil or turf to be cut or cultivated. This cutting-edge may be sharpened to any desired degree. The points C of these teeth are formed by twisting the lower ends of these flat bars until the flat surface of the point shall stand at a right angle to the flat side of the rest of the tooth, this twist being made at $b$, near the point. It is evident that by this construction the point is made to run broadside to the soil to turn and cultivate it, while the rest of the tooth presents a sharp cutting-edge to the upper hard ground or sod, thus rendering the whole operation one of much less difficulty and labor.

Having thus described my invention, what I claim as new, and desire to secure by Letters Patent, is—

A cultivator-tooth formed of a flat bar of metal to present a cutting-edge to the sod, the lower point being twisted so as to present a broadside to the soil, as shown and described.

D. H. BULL.

Witnesses:
 W. L. WAIT,
 GEO. WESTMORELAND.